United States Patent Office 3,827,977
Patented Aug. 6, 1974

3,827,977
COMPOSITION FOR INHIBITING SCALE
FORMATION IN OIL WELL BRINES
Leon H. Miles, Plano, and Graham E. King, Dallas, Tex., assignors to Atlantic Richfield Company, New York, N.Y.
No Drawing. Application Nov. 25, 1969, Ser. No. 879,919, now Patent No. 3,704,750, which is a continuation-in-part of abandoned application Ser. No. 789,927, Jan. 8, 1969. Divided and this application Oct. 2, 1972, Ser. No. 294,249
Int. Cl. C10m 5/12
U.S. Cl. 252—8.55 B           9 Claims

ABSTRACT OF THE DISCLOSURE

A method for introducing an inhibitor, e.g., an inhibitor against scale formation, into oil well brines is disclosed. This method comprises introducing into the porous reservoir structure, i.e., oil-bearing formation adjacent to the bore of an oil well a relatively water or brine insoluble polyvalent metal salt of the inhibitor, e.g., polyacrylic acid and/or hydrolyzed polyacrylamide, the polyacrylic acid having a molecular weight range of about 17,000 to 50,000, and the hydrolyzed polyacrylamide having from about 10% to 50% unhydrolyzed amide groups and a molecular weight of about 1,000 to 8,000, in which the metal is selected from the group consisting of alkaline earth metals, $Zn^{++}$, $Cu^{++}$, $Pb^{++}$, $Fe^{+++}$, $Cr^{+++}$, and $Al^{+++}$. The method comprises in situ formation of the relatively water or brine insoluble polyvalent metal salt of the inhibitor e.g., polyacrylic acid and/or hydrolyzed polyacrylamide, in the reservoir structure by introducing into the porous structure a water-soluble salt of the inhibitor, e.g., the sodium salt of the polyacrylic acid and/or hydrolyzed polyacrylamide, and a water-soluble salt of the polyvalent metal in a strongly acidic, aqueous solution. In the in situ method the strong acid in solution initially inhibits reaction of the salts but is dissipated by the fluids in the oil-bearing formation and neutralized by the formation rock to allow reaction and formation of the desired water-insoluble metal salt of polyacrylic acid and/or hydrolyzed polyacrylamide in the formation.

CROSS REFERENCES TO RELATED APPLICATION

This application is a division of application Ser. No. 879,919, filed Nov. 25, 1969, now Pat. No. 3,704,750, which in turn is a continuation-in-part of application Ser. No. 789,927, filed Jan. 8, 1969, now abandoned.

BACKGROUND OF THE INVENTION

This invention relates to a method for introducing inhibitors such as those for inhibiting scale formation of oil well brines by placing at or near the bottom of the well or in the oil-bearing formation a relatively water-insoluble, i.e., very slowly soluble inhibitor, e.g., scale inhibiting agent which is effective in small quantities. More particularly, this invention relates to the use of polyvalent metal salts of inhibitors, such as polyacrylic acids and/or hydrolyzed polyacrylamides, the polyacrylic acids having a molecular weight of about 17,000 or 20,000 to 30,000 or 50,000 and the hydrolyzed polyacrylamide having from about 10% to 50% unhydrolyzed amide groups and a molecular weight of about 1,000 to 8,000, which can be formed by reaction of a water-soluble metal salt of the poly-acrylic acid and/or hydrolyzed polyacrylamide and a water soluble salt of a polyvalent metal. While the present invention will be described with reference hereinbelow to scale inhibitors, and more partcularly, to the use of metal salts, polyacrylic acids and/or hydrolyzed polyacrylamides as scale inhibitors in oil well brines, the present invention broadly includes the in situ deposition of any inhibitor, commonly used in oil bearing formations, by the method described herein, that is, by introduction of the inhibitor into the oil-bearing formation as two or more water-soluble components in strong acidic solution and reaction and/or precipitation of the water-insoluble inhibitor as the acidic solution is dissipated to place the desired relatively water-insoluble inhibitor in the formation.

Scale deposits from oil well brines and their attendant problems; e.g., increased costs and efficiency loss, are well known in the art. Scale may be defined as a deposit formed on surfaces in contact with water. The most common scales associated with oil field brines are calcium sulfates, barium sulfate and calcium carbonate. Other insoluble sulfates and carbonates may be classified as scale, but are usually found in small quantities along with the three previously mentioned. Corrosion products such as iron oxide and iron sulfide may also be considered as scale. In particular, calcium sulfate, barium sulfate, and calcium carbonate scales deposited upon water contact surfaces in the vicinity of the well bore, in downhole equipment and in surface facilities of a producing well have caused substantial problems such as obstruction of fluid flow, impedance of heat transfer, wear of metal parts, shortening of equipment life, localization of corrosion attack, poor corrosion inhibitor performance and unexpected equipment shutdown.

Many industries are faced with problems in the treatment of scales, but those handling brines from deeply buried earth formations are plagued with a unique combination which makes scale control very difficult. Such large volumes of water, very poor water quality, severe temperature and pressure conditions and the very remote and nearly inaccessible location for treatment where trouble begins are a few of such problems.

Prevention of scale requires an understanding of the conditions under which scale is formed. Three major causes have been identified. These are a mixture of two incompatible waters, changes in physical environment and changes in chemical environment. One incompatible mixture possibility in oil wells is water entry from well casing leaks or poor casing cement jobs above or below the producing interval or oil bearing formation. Obviously, this problem can often be solved by more direct methods than by using scale inhibitors. Another mixture possibility not so easily overcome may occur during water flooding operations at producing wells when injection water from an input well breaks through. It has been shown that no reaction occurs within the formation pore spaces when water incompatible with formation water is injected. The discrete pore channels are filled with injection water displacing formation water during flooding operations and no opportunity for intimate mixing is presented until both formation water and injection water, produced from separate pore channels make contact at the producing well bore face. If these two waters are incompatible, however, there will be some ratio of one to the other which will cause precipitation and scale in the producing well.

No intermixture of water in the formation or well is necessary for scale formation if the brine contains a saturated solution of any salt at bottom-hole conditions. A change in physical environment as formation water moves from the formation into the well bore or from the bottom of the well bore to the surface can be sufficient to cause deposition. This is the most prevalent cause of calcium sulfate scale. As an example, most Permian formation waters in West Texas are so intimately in contact with anhydrite and gypsum that calcium sulfate saturation at conditions of formation temperature and pressure is almost a certainty. Even injection water from other sources quickly become saturated as it passes through these formations.

Chemical environmental changes are also associated with changes in temperature and pressure because of carbon dioxide and hydrogen sulfide gases dissolved in water. In the presence of acid gases, large amounts of calcium bicarbonate can be held in solution. Removal of these gases causes the calcium bicarbonate to change to insoluble calcium carbonate. The amount of calcium carbonate precipitated by removal of $CO_2$ gas from a typical Wyoming formation water can be as high as 0.8 lbs. per barrel of produced fluids.

Once the conditions are set for precipitation, the formation of a scale deposit undergoes several stages. The initial combination of two ions is called the solute molecule. A loosely bound but orderly arrangement of several molecules then forms a lattice which governs the final shape of the crystal. A more closely bound combination of several thousand solute molecules forms a nucleus or seed from which the crystal grows. At this stage the particle is too small to be seen with a microscope, and would even pass the finest filter. Rapid growth from the nucleus stage results in a filterable, microscopic crystal, causing visible turbidity in water. Eventually crystals grow large enough to be seen and finally develop into growths of very large proportion which we call scale. The nucleating surface does not necessarily need to be a crystal nucleus of the scale forming mineral. Any similar substance will serve as a foundation on which scale can grow—gypsum, dolomite, cement, or even iron. Some industries avoid scale buildup, often at great expense, by coating systems with non-nucleating surfaces.

Various means to combat scale formation and its resultant disadvantages have been employed. One of these has been removal and scraping of the pipes for reuse. This method is inadequate because of the long shut-down period involved and the short term effects of the work. Additionally, this method of combating scale formation does not alleviate the problem of scale forming in the pores of the oil-bearing formation, e.g. rock or sand formation through which oil must seep to reach the well and pumping areas. Another method employed in the art to combat scale formation has been the use of chemical removal agents, e.g. hydrochloric acid, pumped, typically along with a corrosion inhibitor, into an oil or water well. Although this method is effective to some extent, the removal agents have failed to prevent scale formation and have sometimes had a deleterious effect on various parts of the metallic equipment. Attempts have also been made to combat scale by introducing an additive down the casing annulus of the well, but such additive treatments again have generally proved unsatisfactory as they fail to remove existing scale and only inhibit the growth of scale in piping and other surfaces. Also additive treatments heretofore known generally, require the use of large amounts of additives and frequent retreatment. While recently slow-release additive systems in which glass-like polyphosphate salts or pelletized carboxymethyl cellulose mixed salts have been used, such salts are generally disadvantageous, particularly in oil well brines because the dissolving polyphosphates revert rapidly to inactive orthophosphates and the carboxymethyl cellulose salts require a relatively high dosage and have a short period of effectiveness. Additionally, in the chemical treatments heretofore used, many methods of applying the inhibiting agent have been used. For example, liquid inhibitors have been squeezed into well bores and into fracture planes in the formation. However, the inhibitor feedback, i.e. release of the inhibitor into the fluids to inhibit scale formation relies on adsorption-desorption of the inhibitor from the sand grains, or in the alternative depends on the differential pressure along the fracture face to meter the inhibitor into the produced fluids, oil and water. With the inhibiting agents used heretofore in adsorption-desorption, there is generally a large amount of the agent that is not absorbed but is produced back, i.e. swept away with the produced fluids, in large wasteful concentrations. In other cases the inhibiting agent is irreversibly adsorbed in the formation and no inhibiting agent is desorbed by the fluids to prevent scale formation. Squeezing liquid scale inhibitors into the well face or fracture face is also practiced. But here also are found disadvantages as a large amount of the inhibiting agent is recovered almost immediately, thus reducing the life of the treatment.

DESCRIPTION OF THE INVENTION

This invention has as one of its objects the addition of a new and novel inhibitor, i.e. inhibiting agent to oil wells to inhibit scale formed from oil well brines. The inhibitor is effective in small quantities and does not rapidly revert to an inactive form. The inhibitor is a relatively insoluble, e.g. very slowly soluble salt thereby guaranteeing slow feedback over extended periods of time. The inhibitor is a solid and can be used for placement at or near the bottom of an oil well, e.g. by packing in the well annulus, in a hydraulically induced fracture, etc., or in a surface feed pot using recycle of produced fluids. Additionally, this invention has as an object a novel method by which an inhibitor, for example, the novel inhibitor described below, can be formed in situ in the porous oil-bearing rock formation adjacent to a well bore or in a fracture plane emanating from the well bore. The inhibitor, as it is slowly dissolved, will inhibit the formation of the various precipitates known as scale and prevent the deposit of these scales in the rock formation in the vicinity of the well bore, downhole equipment and surface facilities of a producing well.

The novel inhibiting agents of this invention are water-insoluble metal salts of relatively low molecular weight polyacrylic acids and/or relatively low molecular weight hydrolyzed polyacrylamides, the metal of which is a polyvalent cation which does not react in oil well brines with the brine, oil or metal well parts. Suitable cations are the alkaline earth metals, $Zn^{++}$, $Cu^{++}$, $Pb^{++}$, $Fe^{+++}$, $Cr^{+++}$, and $Al^{+++}$, preferably calcium and zinc. It is believed that these salts are effective inhibitors in inhibiting the growth of crystals at the seed or nucleation stage of the crystal in the brines.

The polyacrylic acid metal salts of this invention can be prepared by reacting an aqueous solution of a relatively low molecular weight water soluble metal salt, e.g. sodium salt of polyacrylic acid having a molecular weight in the range of about 5,000, or 7,000 up to about 50,000 or even possible 100,000 but, generally, the molecular weight is in the range of about 17,000 to 50,000, preferably from about 20,000 up to about 30,000 (e.g. about 300 repeating units), with a concentrated solution of a water-soluble salt of the desired polyvalent cations such as the chlorides of the alkaline earth metals, $Zn^{++}$, $Cu^{++}$, $Pb^{++}$, $Fe^{+++}$, $Cr^{+++}$, and $Al^{+++}$. The molecular weights referred to also apply to the produced metal salt of this invention and are determined by gel permeation gas chromatography comparison of the esterified polymer. In general, the higher the molecular weight of the polyacrylic acid, and consequently of the produced metal salt, the less desirable is the produced metal salt as an inhibitor. In general, reaction of the water-soluble salts is carried out by mixing at room temperature or slightly higher, e.g. up to about 100° C. Preferably, the metal salt is added to an aqueous solution of the polyacrylic acid salt until no more precipitate is formed. Any water-soluble metal salt of polyacrylic acid and water soluble polyvalent metal salt can be used provided the polyvalent metal replaces the metal cation of the polyacrylic salt to produce a water-insoluble salt of the polyacrylic acid.

The relatively water-insoluble polyvalent metal salt of polyacrylic acid is then separated from the aqueous solution, e.g. by filtration, decantation or sedimentation, washed with water, and dried, e.g. at temperatures of about 120° F. to 180° F. Drying decreases the solubility of the polyvalent metal salt in water and also increases its crush strength. The resultant solid polyvalent metal salt inhibitor can then be crushed to the desired particle size, or in the alternative, the solid can be extruded into any desired shape before drying.

The low molecular weight hydrolyzed polyacrylamide component of the present invention can properly be termed a polycarboxyethylene-polycarbamylethylene long chain carbon-to-carbon polymer. It is a polyelectrolyte. In the acid from the polymer has the probable formula:

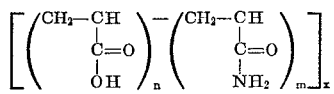

where $n$ and $m$ are whole numbers, such that $n$ is at least about as large as $m$, and not more than about 9 times as large as $m$, and $n$ and $m$ and $x$ have such size that the total molecular weight is between 1,000 and 8,000, preferably between 4,000 and 7,000, and the two groups may occur in random order and orientation. The polyacrylamide has from 10% to 50% unhydrolyzed amide groups, and preferably from about 20% to about 40%. Conveniently for in situ formation of the inhibitor, the polymer is added as an alkali metal salt, usually the sodium salt. Potassium, ammonium or other soluble salts may be used, and all of the acidic hydrogens need not be replaced, nor of those replaced need the cation be the same. As the polymer is used in dilute solution, and the cation, be it alkali metal or hydrogen, etc., is dissociated to an extent that varies with the concentration of other cations present, the polymer at the time of action can be considered in a transient state, and for purposes of convenience, the name of the acid form is used for identification without the intention that the polymer be in such acid form. The hydrolyzed low molecular weight polyacrylamide in one specific embodiment is a dry light cream-colored solid having a molecular weight of 6,000, a polymer content of 75%, with the polymer being 75% carboxyl and 25% amide, and the diluents being primarily sodium and ammonium sulfates and sodium hydroxide. The pH of a 1% aqueous solution is 10.8 and of a 10% solution is 12.1. The solubility is over 25% in solutions having a useful viscosity.

While there is a relatively broad range of acceptable particle size for the inhibitor, the particles desirably are small enough to enter the formation fracture and not so fine that they will be transported easily into the interstices of the proponent sand used in sand fracturing processes. In normal fracturing operations a sand grain size and therefore a desirable inhibitor particle size is in the range of about 6 to 60, preferably about 20 to 40 mesh. When the inhibitor is extruded, it can be formed into sticks, or other shapes for dropping down the well bore or casing.

The metal salts, polyacrylic acids and hydrolyzed polyacrylamides, as defined above, can be present singly, or in mixed form, with the molar ratio of acid to acrylamide being from about 100:1 to 0.1:1, preferably from about 9:1 to 1:1. The mixed form of metal salts of polyacrylic acids and hydrolyzed polyacrylamides can be prepared by reacting a concentrated solution of a water-soluble salt of the desired polyvalent cation with a mixed solution containing both a water-soluble metal, e.g. sodium, salt of the low molecular weight polyacrylic acid and a water-soluble metal, e.g. sodium, salt of the hydrolyzed polyacrylamide, the acid and acrylamide being present within the aforementioned molar ratios. Alternatively, the mixture can be formed by mixing the solid polyvalent metal salts of each of the polyacrylic acid and hydrolyzed polyacrylamide in the desired molar ratios.

The method for in situ formation of an inhibitor in an oil bearing formation, e.g. formation of the polyvalent metal salt in the oil-bearing formation generaly comprising introducing into the porous formation adjacent to the well bore, a strongly acidic aqueous solution, i.e. pH below about 1.5, containing a water-soluble salt of the inhibitor, e.g. sodium salt of polyacrylic acid and/or sodium salt of hydrolyzed polyacrylamide, and a water-soluble salt of the desired polyvalent metal. Generally, any strong acid, such a hydrochloric acid, can be used to form the acidic aqueous solution, although sulfuric acid is not generally desirable since the sulfate ion presents scale problems. Other suitable acids are acetic, combinations of HCl and acetic, etc. The acid inhibits reaction of the water-soluble salts in solution, but upon introduction of the acidic solution into the well and formation surrounding the well, the acid is dissipated and in part neutralized by the produced fluids and the oil-bearing formation so that the water-soluble salts then react to produce the water-insoluble metal salt of the inhibitor. This process has an advantage over most in situ processes known heretofore since, although the water insoluble salt is formed in situ it is produced as a mixture of the soluble and insoluble salts in the presence of an excess of water. Thereafter the water-soluble portion of the mixture is rapidly dissolved from the formation, leaving only the insoluble salt. The advantage to this is that the pores of the oil bearing formation are not plugged by the inhibiting agent and contact of the oil well brine and inhibiting agent is insured. This method of in situ formation of an inhibitor is applicable to any inhibitor, particularly an organic inhibitor comprising a relatively water-insoluble metal salt, e.g. polyvalent metal salt of the organic inhibitor, precipitated upon reaction of a water-soluble salts of the metal, e.g. polyvalent metal, and a water-soluble salt of the organic or negative portion of the inhibitor in neutral, somewhat acidic or alkaline solution, but not precipitated in strongly acidic, e.g. pH 1.5 or less, solution. The water-soluble salts used to form such inhibitors conversely include any such salts, i.e., the water-soluble metal salt and water-soluble salt of the organic or negative ion, which will not react and/or precipitate in strongly acidic solution but will react and/or precipitate as the acid in the solution dissipates to precipitate the desired inhibitor. In general, polyvalent metal salts of organic compounds tend to be water-insoluble, but acid-soluble, whereas alkali salts of such organic compounds tend to be water-soluble. Accordingly, this method is particularly applicable to the in situ formation and precipitation of polyvalent metal salts of organic inhibitors. Suitable water-soluble polyvalent metal salts for use in the in situ method of this invention include the chlorides of the polyvalent metals and suitable water-soluble organic salts include the alkali metal salts, particularly sodium salts of the organic inhibitor.

Generally an amount of inhibitor is added to the well, or formed in situ in the formation surrounding the oil well, sufficient to provide in the produced fluids an amount of the inhibitor effective for the intended purpose, e.g. to inhibit the formation of solid scale deposits such as calcium or barium sulfate or calcium carbonate scale, at or near the bottom of the well. This effective amount is typically in the range of about 0.1 to 25 p.p.m., preferably about 0.25 to 10 p.p.m. in the produced water. The amount of inhibiting agents desired to be introduced into a particular oil well for scale inhibition depends in fact upon such features as the composition of the oil well brine, i.e., amount of scale forming minerals such as sulfates or carbonates, amount of water produced in the well, temperature of the formation, etc. which will vary from well to well, or formation to formation. Generally, for example, the inhibiting agents of this invention are more insoluble at higher temperatures so that more inhibitor will be required in the formation to provide the desired concentration in the produced water. Also, although generally, oil well brines have a total concentration of scale forming minerals, e.g., calcium or barium sulfates, calcium carbonate, etc., in amounts up to several thousand, e.g. 2,000 parts per million, the use of the inhibitor of the present invention in even smaller amounts, less than the desired amounts set forth above, will provide less scale deposits in the oil well brine. When the inhibitor is formed in situ, the acidic solution introduced into the well will, of course, be driven a distance, e.g., several inches, 4 or 5, to several feet, 2 or 3, or more, into the formation outwardly of the well. If desired, the inhibitor may be driven to greater distances outwardly of the well by following the acidic solution with an overflush, such as water or oil. Since the amount of inhibitor required in the formation to provide the desired concentration in the produced water is small, the concentration of water-soluble salts in the acidic solution can be low. For example, to produce a salt of polyacrylic acid, e.g., calcium salt, in situ, water soluble sodium polyacrylate can be used as a ½% solution of the salt up to such an amount, e.g. about 10%, where the density of the precipitated inhibitor is so high that the precipitate plugs the formation. Preferably, the sodium polyacrylate is used in concentrations below about 5% by weight and usually in the range of ½ to 1% by weight. While it would be optimum to use a stoichiometric amount of the polyvalent metal salt, usually a large excess is used to insure complete reaction of the organic inhibitor, e.g. polyacrylate. For example, concentration of about ½ to 1½% by weight $Ca^{++}$ are used with ½ to 1% solutions of the sodium polyacrylate. The same concentrations apply for the water-soluble hydrolyzed polyacrylamide. The use of large amounts of low concentration solution also is beneficial since it insures wide distribution of the inhibiting agent outwardly from and around the well base, thereby avoiding plugging of the formation and providing full inhibition.

The following examples are set forth to more clearly illustrate the present invention, but are not to be considered as limiting the scope of applicants' invention.

EXAMPLE I

The following is an example of effectiveness of the Zn salt of hydrolyzed polyacrylamide having a molecular weight of about 1,000 to 8,000 formed by reaction of ZnCl and hydrolyzed sodium polyacrylamide of molecular weight about 1,000 to 8,000 in aqueous solution of about pH 9 to 9.5. The salt contains 20.25 percent Zn in its structure. A base solution of a brine containing 100,000 mg./l. chloride ion and 140 mg./l. $SO_4^=$ is caused to form scale by adding $BaCl_2$ crystals in excess. The amount of barium sulfate formed was determined colorimetrically. To a blank test comprising a 1:1 mixture of the base solution and distilled water was added $BaCl_2$. The amount of $BaSO_4$ formed was determined. A four gram Zn polyacrylamide sample was added to one liter of distilled water and permitted to stand for several days. During this period, small samples of the solution were removed and filtered. The filtrate was diluted with various amounts of distilled water. The diluents were combined with the base solution and the diluted filtrate. $BaCl_2$ was added to the test solution containing Zn polyacrylamide and the $BaSO_4$ formed was measured. The $Zn^{++}$ concentration of the filtrate was determined by atomic absorption techniques. The results are set forth below.

TABLE

| Time | $Zn^{++}$ concentration in the filtrate, gm./liter | Percent filtrate in the test solution (remainder is base solution) | Percent inhibition |
|---|---|---|---|
| 1 day | 13 | 10.0 | 59 |
|  |  | 5.0 | 42 |
| 2 days | 17 | 10.0 | 77 |
|  |  | 5.0 | 50 |
| 7 days | 36 | 10.0 | 97 |
|  |  | 5.0 | 92 |
|  |  | 2.5 | 64 |
| 10 days | 46 | 10.0 | 100 |
|  |  | 5.0 | 96 |
|  |  | 2.5 | 73 |
|  |  | 1.25 | 36 |

The percent inhibition is defined 100 $(W_b - W_t)/W_b$, where $W_b$ is the weight of the precipitate formed per unit volume in the blank test and $W_t$ is the weight of precipitate formed per unit volume in the test solution. An extrapolation of the longer test shows that this amount of Zn polyacrylamide in a liter of water will dissolve completely in approximately one year.

EXAMPLE II

A calcium salt of the same hydrolyzed polyacrylamide is tested in a similar manner as Example I. Two grams of salt added to a liter of water showed a solubility of 100 mg./l. after 24 hours. After three months approximately 70 percent of the polymer had dissolved and was effective in inhibiting barium sulfate precipitation in concentrations as low as 1 part of filtrate to 185 parts of the base solution. These salts are also effective in inhibiting $CaCO_3$ and $CaSO_4$ scale.

EXAMPLE III

Introduction of fluids and solids to an oil well for a fracturing operation is accomplished with standard pumping and procedures with the exception of blending sand and inhibitor. Treatment consists of 7000 lbs. of 20-40 mesh sand, 1000 lbs. of 20-40 mesh treating chemical, and 10,000 gallons of gelled fracturing water. The materials are pumped into the well as follows:

1000 gallons of gelled water to initiate a fracture, followed by 8000 gallons of gelled water with sand and chemical blended together to give an average solids concentration of 1 pound/gallon, the mix being 7 parts "frac" sand and 1 part treating chemical by weight; and subsequently 1000 gallons of water to displace the well tubing. The Zn and Ca polyacrylamide inhibitors described in Examples I and II, as the chemical, are effective in inhibiting scale formation when placed in amounts sufficient to provide about 0.25 to 10 p.p.m. in the produced water.

EXAMPLE IV

In situ formation of an inhibitor was accomplished as follows. A Berea core sample was saturated with a brine having the following constituents:

| | |
|---|---|
| Chlorides | 95,900 |
| Bicarbonate | 0 |
| Carbonates | 21 |
| Calcium | 4,680 |
| Sulfates | 76 |
| (OH) Hydroxide* | 449 |
| pH | 11.6 |

*(NOTE: The OH ion is not usually found in oil field brines. In this case it was added in the place of $CO_3$ to react with the acid treating solution so that no gas would be formed. Gas saturation would have interfered with the permeability measurements as it was desired to evaluate the possibility of core blockage or permeability reduction by the polymer salt.)

A treating slug of .05 pore volumes was injected into the "A" face of the core. The slug consisted of the following:

8.1% of 37% HCl acid
5.8% of a 18.2% sodium polyacrylamide solution, MW 1,000 to 8,000
86.1% of a brine containing:
  97,000 p.p.m. Chlorides
  74 p.p.m. Sulfates
  4,960 p.p.m. Calcium
  6.45 pH
  .1 Bicarbonates
  0 Carbonates The slug was displaced from faces A to B of the core with 0.7 pore volume of a brine having the same properties as the slug brine. Analysis of the effluent at B showed no polymer was produced or lost from the core during the displacing process. Injection of the same displacing brine was begun from A to B, representing flow from a formation to a well bore. Analyses of samples showed production of a calcium polyacrylamide inhibitor in sufficient quantities to inhibit the formation of scale. The polymer was not produced at an excessively high rate during the first 2 pore volumes as is common in a chemical squeeze job that relies on adsorption-desorption to maintain a slow chemical feedback.

After 7.5 pore volumes of brine had been produced, the polymer concentration or production rate could be analyzed as a first order equation of the form $y = 30 \log x - 21$. $y$ = mg. of the polymer produced. $x$ = No. of pore volumes of throughput. Core permeability measurements indicated no reduction in permeability from in situ precipitation of the polymer salt.

EXAMPLE V

The in situ precipitation of calciumpolymer salts was visually observed in a micro visual cell. A glass cell represented a porous medium, the cell being a monolayer packed in a hexagonal manner with 0.007 inch diameter glass beads. The pore volume of the cell was 0.89 cc. and the consistent and low pump rates were possible by use of a low volume constant rate pump.

Through the use of time lapse photography, and a 200 power microscope, it was shown that in situ precipitation of a polymer salt does occur. The polymer salt could be seen adhering to the glass beads and in the interstices of the beads. The cells showed that most of the precipitation occurred in a band near the interface of the polymer solution and the cell saturating solution. In the cells that were flushed or backflowed with 2 pore volumes of brine, there was no visual removal of the polymer salt and practically no migration of polymer salt from its original location in the cell. All micro visual studies were conducted using the solutions described in the core study data.

EXAMPLE VI

Fifty wells have been treated by the method of this invention. No surface indications of scale have been recorded, although the production areas are subject to severe scale problems. Two wells were inspected approximately 2 months after treatment due to mechanical problems. There was no evidence of scale formation on the downhole equipment. Typical field treatment has been to use a mix of 60 bbls. lease water, 100 gallons 15% HCl acid, and 165 gallons of an 15–18% sodium polyacrylamide, MW 1,000 to 8,000 solution which is squeezed into the formation and flushed with approximately 200 bbls. of lease water. The lease water contains 8,000–10,000 p.pm. calcium.

EXAMPLE VII

Copper, lead, iron, chromium, aluminum and magnesium polyacrylamides equivalent to those identified in Examples I and II are added to an oil well brine to inhibit scale formation.

EXAMPLE VIII

Copper, lead, iron, chromium, aluminum and magnesium polyacrylamides are formed in situ using the method of Examples IV and V by reacting the corresponding metal chloride and sodium polyacrylamide in HCl solution (pH 1.5) and precipitating the desired polyacrylamide as the acid is dissipated.

EXAMPLE IX

The zinc salt of polyacrylic acid having a molecular weight of about 17,000 to 20,000 formed by the reaction of $ZnCl_2$ and sodium polyacrylate of molecular weight about 17,000 to 20,000 in an aqueous solution of about pH 9 to 9.5 is added to an oil well brine to inhibit scale formation.

EXAMPLE X

The calcium salt of polyacrylic acid having a molecular weight of about 17,000 to 20,000 formed by the reaction of $CaCl_2$ and sodium polyacrylate of molecular weight of about 17,000 to 20,000 is added to an oil well brine to inhibit scale formation.

EXAMPLE XI

Copper, lead, iron, chromium, aluminum and magnesium polyacrylates equivalent to those identified in Examples IX and X are added to an oil well brine to inhibit scale formation.

EXAMPLE XII

Zinc, calcium, copper, lead, iron, chromium, aluminum and magnesium polyacrylates are formed in situ using the method of Examples IV and V by reacting the corresponding metal chloride and sodium polyacrylate in HCl solution (pH 1.5) and precipitating the desired polyacrylate as the acid is dissipated.

The embodiments of the invention in which an exclusive property or privilege is claimed are defined as follows:

1. A scale inhibitor for use in inhibiting the formation of scale in oil well brines consisting essentially of a relatively water-insoluble polyvalent metal salt of at least one of polyacrylic acid and hydrolyzed polyacrylamide, in which the polyvalent metal is selected from the group consisting of alkaline earth metals, $Zn^{++}$, $Cu^{++}$, $Pb^{++}$, $Fe^{+++}$, $Cr^{+++}$, and $Al^{+++}$, the polyacrylic acid has a molecular weight range of about 5,000 to 50,000 and the hydrolyzed polyacrylamide has from 10% to 50% unhydrolyzed amide groups and a molecular weight of about 1,000 to 8,000.

2. A scale inhibitor according to claim 1 wherein said polyacrylic acid has a molecular weight range of about 17,000 to 50,000.

3. A scale inhibitor according to claim 1 wherein said polyacrylic acid has a molecular weight range of about 20,000 to 30,000.

4. A scale inhibitor according to claim 2 wherein the polyvalent metal is selected from the group consisting of zinc and calcium.

5. A scale inhibitor according to claim 1 wherein said hydrolyzed polyacrylamide has from 20% to 40% unhydrolyzed amide groups and a molecular weight of about 1,000 to 8,000.

6. A scale inhibitor according to claim 1 wherein the polyacrylamide has from about 20% to about 40% unhydrolyzed amide groups and a molecular weight of about 4,000 to 7,000.

7. A scale inhibitor according to claim 1 wherein the polyacrylamide has a molecular weight of about 4,000 to 7,000.

8. A scale inhibitor according to claim 1 wherein said inhibitor consists essentially of polyacrylic acid salt.

9. A scale inhibitor according to claim 1 wherein said inhibitor consists essentially of hydrolyzed polyacrylamide salt.

References Cited

UNITED STATES PATENTS

| | | | |
|---|---|---|---|
| 2,552,775 | 5/1951 | Fisher et al. | 252—8.5 |
| 3,502,149 | 3/1970 | Pence | 252—8.55 |
| 2,783,200 | 2/1957 | Crum et al. | 252—180 X |
| 3,400,078 | 9/1968 | Jones | 252—8.55 |
| 3,288,217 | 11/1966 | Ralston | 252—8.55 |
| 3,463,730 | 8/1969 | Booth et al. | 252—180 |

FOREIGN PATENTS

| | | | |
|---|---|---|---|
| 724,683 | 2/1955 | Great Britain | 252—181 |

BENJAMIN R. PADGETT, Primary Examiner

B. HUNT, Assistant Examiner

U.S. Cl. X.R.

166—279, 305 P, 300, 308, 310; 252—8.55 R, 8.5 C, 180, 181